Patented Jan. 23, 1934

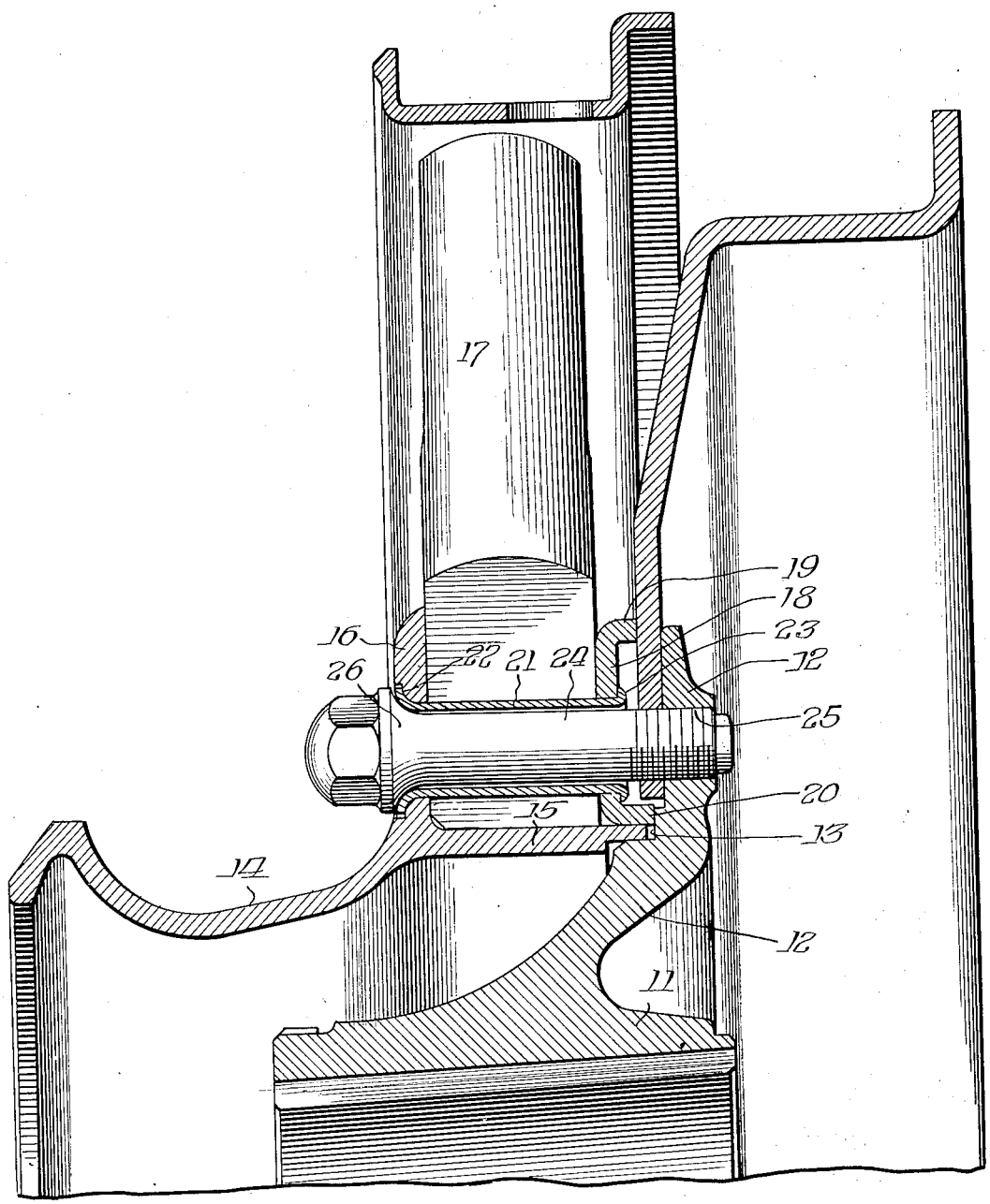

1,944,724

UNITED STATES PATENT OFFICE 1,944,724

HUB ASSEMBLY FOR WHEELS

Charles R. Stough, Lansing, Mich., assignor to Motor Wheel Corporation, Lansing, Mich., a corporation of Michigan Application September 13, 1928
Serial No. 305,649

3 Claims. (Cl. 301—9)

By my invention tubular rivets, terminally upset to bind the parts of the spider and hub shell permanently together, are utilized as holes or sockets for the stud bolts attaching the spider and hub shell demountably to the hub; the external conformation of the bolts adjacent their heads having such relationship to the internal conformation of the tubular rivet at its mouth as to obtain a line contact and a wedging action therebetween.

The accompanying drawing, illustrative of a preferred embodiment of the invention, shows a radial section through a wheel and its securing means. Describing the invention with reference to the drawing, a wheel hub is represented at 11 having a permanent attaching flange 12 provided with a stepped shoulder on its forward face at 13. A hub shell 14 has a laterally-extending barrel portion 15 adapted to seat upon the shoulder 13. The hub shell also comprises a radial flange 16.

The wheel body, here shown as a spider comprising a radiant series of spokes 17, is seated within the angle formed by the shell barrel 15 and shell flange 16 and rests advantageously upon said barrel. An annulus 18 is disposed outwardly of the barrel 15 and opposite the flange 16. This annulus may advantageously be formed at its outer edge with a lipped-over portion 19 for bearing against the brake drum where present or, otherwise, against the hub flange, and it may also have its inner edge advantageously lipped-over as indicated at 20 to rest upon the shell barrel 15 and to bear against the hub flange at the shoulder 13.

The wheel body, here shown as a spoke spider although it may be of disk or other desired construction, is transfixed by a concentric series of tubular rivets 21, which rivets have flaring or inwardly coned mouths 22. These rivets are seated tightly within apertures formed in the wheel body and have their flaring ends fitted to correspondingly flared apertures in the flange 16. These rivets, when arranged in transfixing relation to the flange 16 and the annulus 18 as also the wheel body, have their rear ends upset by swaging as indicated at 23 whereby the wheel body is permanently assembled with the hub shell 14.

Attaching elements 24, herein referred to generically as bolts, are disposed loosely within the tubular rivets 21 and have their inner ends adjustably seated in the hub flange 12 at 25. The shanks of the bolts adjacent their heads are filleted or flared at 26 on lines having a less inclination to the bolt axis than that of the flaring mouth 22 of the tubular rivets or, where the rivets and bolts are flared along curved lines as illustrated, the filleted portion of the bolts has a greater radius than the flaring mouth of the rivets.

By the relative proportioning of the bolts and of the rivets where in contact, a circular line contact is insured therebetween and a wedging action obtained as the bolts are screwed home in the act of assembling the wheel body upon the hub, thereby obtaining accuracy of placement, ease of mounting and demounting, and a locking reaction between the bolts and their point of engagement with the hub.

I claim:

1. A demountable-at-the-hub spoked wheel comprising inner and outer radially extending attaching plates, one provided with an axial extension through the hub hole of the wheel, flaring mouthed tubular rivets transfixing the wheel body and plates and permanently clamping the two plates together upon the wheel body, and flaring headed bolts extending loosely through the tubular rivets for detachably mounting the assembled wheel body upon the hub, the flare of the bolt heads having a greater radius than that of the rivet mouths whereby the bearing of the bolt heads within the rivet mouths is that of line contact only.

2. In a demountable wheel, the combination with a hub flange, of a spoked wheel comprising front and rear wheel assembly plates disposed on each side of the spokes in the hub zone, the rear plate being rearwardly channeled to present inner and outer bearing annuli for seating upon the hub flange, means for permanently clamping the plates upon the wheel spokes comprising tubular rivets having flaring mouths, and coaxial means for clamping the assembled spokes and channeled plate upon the hub flange with an intervening space between the bearing annuli, said means comprising bolts disposed loosely within the tubular rivets and having heads flared upon a greater radius than the flaring mouths of the rivets whereby a line contact bearing of the bolts and rivets is assured.

3. In a demountable wheel, the combination with a hub flange, of a spoked wheel comprising front and rear wheel assembly plates disposed on each side of the spokes in the hub zone, means for permanently clamping the plates upon the wheel spokes comprising tubular rivets having flaring mouths, and coaxial means for clamping the assembled spokes and plates upon the hub flange, said means comprising bolts disposed loosely within the tubular rivets and having heads flared upon a greater radius than the flaring mouths of the rivets whereby a line contact bearing of the bolts and rivets is assured.

CHARLES R. STOUGH.